United States Patent
Egami et al.

[11] Patent Number: 6,131,050
[45] Date of Patent: *Oct. 10, 2000

[54] CONTROL DEVICE HAVING A CONTROL LOGIC SWITCHING FUNCTION

[75] Inventors: Masahiro Egami, Tanashi; Yuh Shiohara, Chigasaki; Tetsuya Minegishi, Koganei; Yasuyuki Hisashi, Tokorozawa; Takashi Sato; Hiromitsu Morimoto, both of Tokyo, all of Japan

[73] Assignees: International Superconductivity Technology Center, The Juridical Foundation; Ishikawajima-Harima Heavy Industries Co., Ltd.; Ishikawajima System, all of Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/872,707

[22] Filed: Jun. 11, 1997

[30] Foreign Application Priority Data

Jun. 13, 1996 [JP] Japan .................................... 8-152697

[51] Int. Cl.[7] .................................................. A63G 31/08

[52] U.S. Cl. ..................................... 700/4; 700/7; 700/75; 700/79; 700/87; 700/82

[58] Field of Search .................................... 364/133, 136, 364/131, 190; 700/2, 4, 7, 19, 75, 87, 82

[56] References Cited

U.S. PATENT DOCUMENTS

| | | | |
|---|---|---|---|
| 4,442,391 | 4/1984 | Yu-Kuang | 318/663 |
| 5,719,999 | 2/1998 | Nishidai et al. | 395/3 |
| 5,768,122 | 6/1998 | Motoc | 364/148 |

FOREIGN PATENT DOCUMENTS

| | | |
|---|---|---|
| 2-161529 | 6/1990 | Japan . |
| 5-282613 | 10/1993 | Japan . |
| 7-295602 | 11/1995 | Japan . |

*Primary Examiner*—Albert De Cady
*Assistant Examiner*—Esaw Abraham
*Attorney, Agent, or Firm*—Pearne & Gordon LLP

[57] ABSTRACT

A control device having control logics that respectively generate operated quantities by simutaneously parallel-processing observed quantities obtained from a controlled object. A switch selectively outputs one of the operated quantities to the controlled object based on instruction data.

5 Claims, 2 Drawing Sheets

CONTROL DEVICE HAVING A CONTROL LOGIC SWITCHING FUNCTION

BACKGROUND OF THE INVENTION

1. Technical Field of the Invention

The present invention relates to a control device and method used for controlling controlled objects, especially those which are continuously operated.

2. Background Art

Generally, in control devices, the various control parameters are set depending on the operating characteristics of the controlled objects, that is, the response characteristics of observed quantities which are outputted from the controlled objects with respect to operated quantities inputted from the control device. The operated quantities are generated by applying a standard procedure to the observed quantities based on the various control parameters set in this manner, by means of a predetermined control logic.

However, due to changes (modifications) in the operating characteristics of the controlled objects, changes in the noise environment, or restrictions on the input/output signals of the controlled objects, there are cases wherein modifications to the control parameters or modifications in the control logic become necessary. Conventionally, in these cases, since the control device must be stopped and the hardware or software structure changed, the controlled objects must be halted over a standard period of time. For example, in the case of the control of various chemical plants, it is impossible to halt the plants in order to modify the control structure.

SUMMARY OF THE INVENTION

The present invention was made in consideration of the above-mentioned problems, and has the below points as objectives.

a. To offer a control device wherein the controlled objects are never halted after control of the controlled objects has started, in response to modifications of the structure thereof.

b. To offer a control device wherein the modifications to the structure are easy.

c. To offer a control device capable of suppressing the costs required to modify the structure.

In order to attain these objectives, the invention according to the control device of the present application employs means comprising a plurality of control logics for respectively generating operated quantities by simultaneously parallel-processing observed quantities obtained from a controlled object; and switch means for selectively outputting one of the operated quantities to the controlled object based on instruction data from operation means.

Additionally, the invention according to the control method of the present application employs means comprising steps of respectively generating a plurality of operated quantities by simultaneously parallel-processing observed quantities obtained from a controlled object; and selectively outputting one of the operated quantities to the controlled object.

With this type of invention of the present application, one control logic can be modified while the other control logic is being used to control the controlled object, so that the controlled object is never halted during modifications of the control structure.

DETAILED DESCRIPTION OF PREFERRED EMBODIMENT OF THE INVENTION

A preferred embodiment of the control device and method according to the present invention will be explained with reference to FIG. 1 and FIG. 2.

Figure 1:
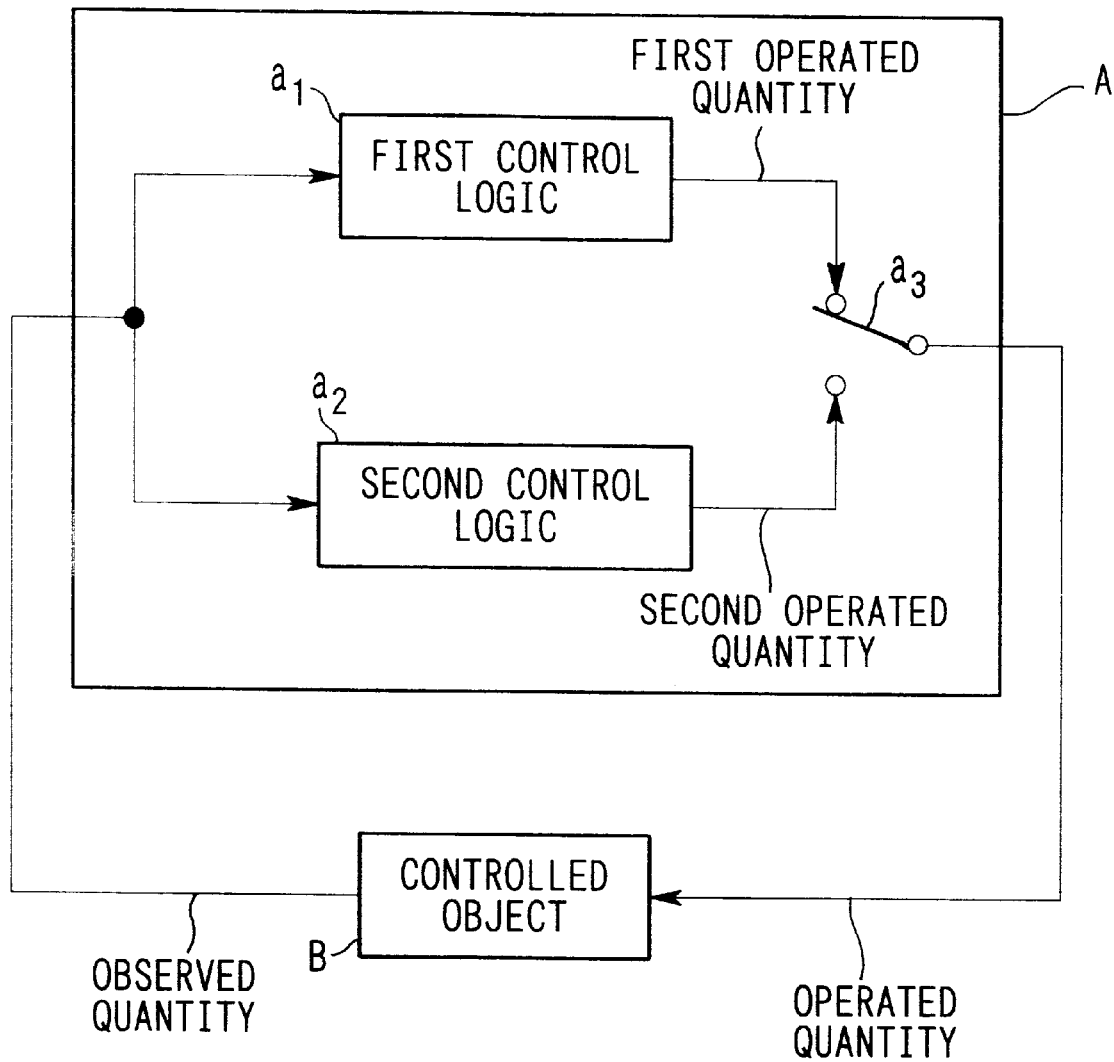
FIG. 1 is a functional block diagram showing the structure of a preferred embodiment of the control device and method according to the present invention.

In FIG. 1, the letter A denotes a control device composed of a computer for performing multi-task processing, which calculates and generates operated quantities based on observed quantities outputted from the controlled object B and internally stored control parameters, then controls the controlled object B by means of the operated quantities. This control device A functionally comprises a first control logic a1, a second control logic a2 and a switch a3.

The first control logic a1 and the second control logic a2 are logics for generating operated quantities which are simultaneously parallel-processed as separate tasks, of which the first control logic a1 generates a first operated quantity by real-time processing of an observed quantity, and the second control logic a2 generates a second operated quantity by real-time processing of the observed quantity. The switch means a3 selectively switches between the above-mentioned first operated quantity and the second operated quantity to output to the controlled object B.

Figure 2:
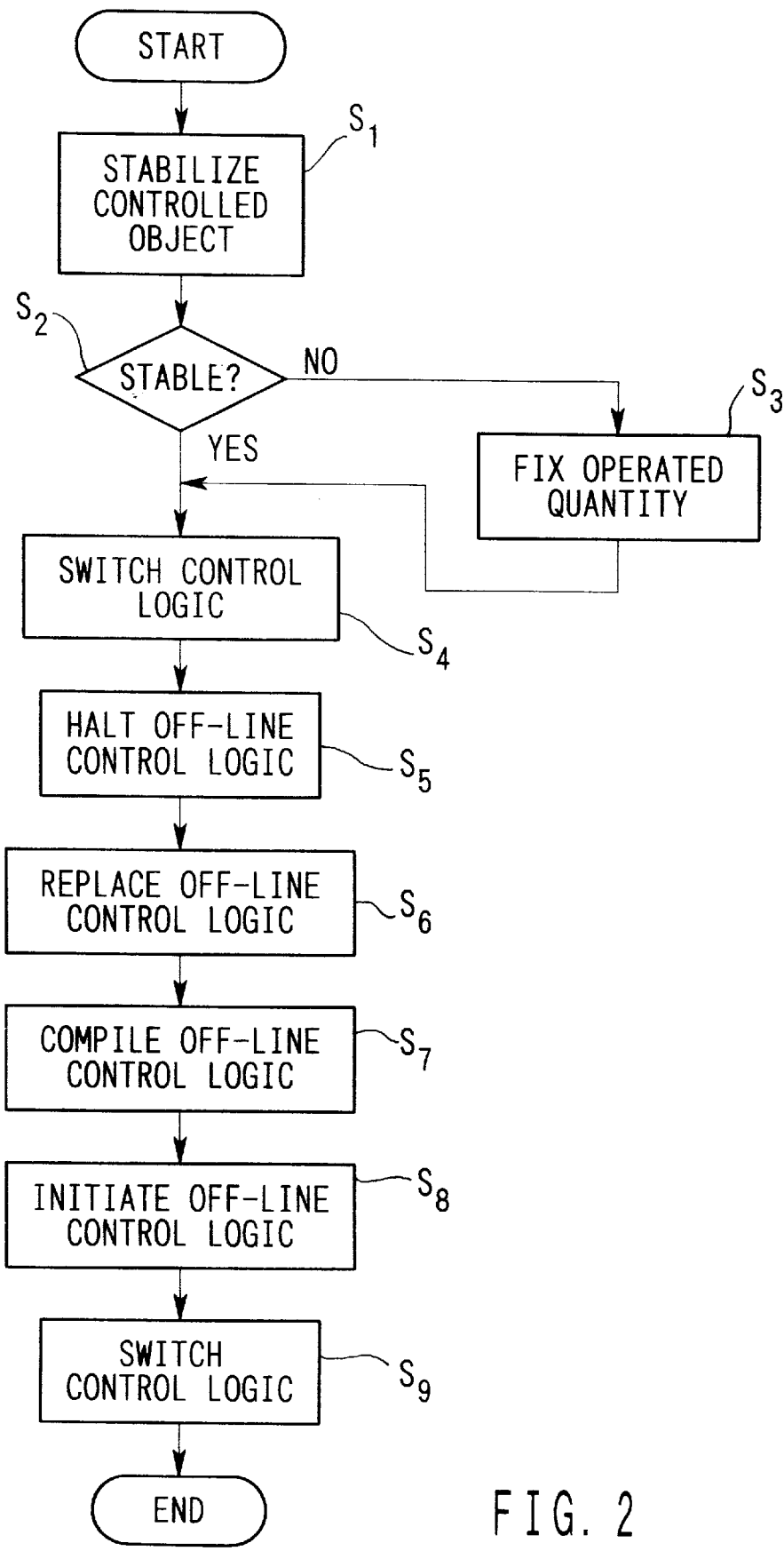
FIG. 2 is a flow chart for explaining the operations of a preferred embodiment of the control device and method according to the present invention.

Next, the process for switching between the first operated quantity and the second operated quantity in the above-mentioned control device A is explained in detail by following the flow chart shown in FIG. 2.

First, in step S1, the activity of the controlled object B is stabilized. For example, if it is determined from the observed quantity that the controlled object B is in steady-state operation, that is, in a state of stable operation, then an operated quantity is generated such that the controlled object B is transferred to steady-state operation. The procedure at this step S1 may be automatically performed by the control device A by comparing the observed quantity with a predetermined threshold value, or may be achieved by a manual operation by an operator who manages the control device A.

In step S2, it is determined whether or not the controlled object B is in a state of stable operation, and if the answer is "NO", then the operated quantity outputted from the switch a3 is coercively fixed to a constant value (step S3). If the answer in step S2 is "YES" and the procedure of step S3 is terminated, the operated quantity outputted from the switch a3 is switched from the first operated quantity to the second operated quantity. That is, at this time, the subject of control of the controlled object B is switched from the first control logic a1 to the second control logic a2 (step S4). Additionally, both automatic processing and manual processing by an operator can also be considered in the procedures of steps S2–S4.

In this state, the first control logic a1 is put into an off-line state, so that the processing, that is, the task processing of the first control logic a1 is halted (step S5). Then, the program which is the subject of the first control logic a1 is replaced with a program for a new modification (step S6). Here, the program of the first control logic a1 which is newly entered into the control device A has the control parameters and processing details pre-modified by means of another computer.

In step S7, if the new program of the first control logic a1 is a source code, then the new program is compiled and an executable code is generated. Then, the new program is run and the first control logic a1 is initiated (step S8). When the first control logic a1 is initiated, parallel-processing of the observed quantity started along with the second control logic a2 which controls the controlled object B. The procedures of steps S1–S8 are automatically performed by the control device A.

Finally, in step S9, the operated quantity outputted from the switch a3 is switched from the second operated quantity to the first operated quantity, and the controlled object B is returned to a state of control by the first control logic a1. The procedure of step S9 is performed either automatically by the control device A or manually by an operator. Here, in the above-mentioned group of switching procedures, steady operation of the controlled object B continues by means of control by the second control logic a2, and the operation is never halted.

Additionally, each control logic is achieved by means of a program which is multi-task processed on a computer, so that the control logic can be modified by replacing the program, thus making it extremely easy to make structural modifications to the control logic.

Furthermore, the costs required to make structural modifications can be held to a minimum because modifications can be made to the control device without stopping the controlled object.

While the embodiment explained above describes a control device with two control logics, the present invention is not restricted to such a composition, and those having three or more control logics also belong within the scope of the present invention. For example, if modifications are to be made to a control device having three control logics, it is possible to switch between two of the control logics while the first control logic is being replaced, thereby stably maintaining the continuous operation of the controlled object.

What is claimed is:

1. A control device, comprising:

a first control logic that receives observed quantities from a controlled object and generates a first operated quantity by performing a real-time processing of the observed quantities based on a first program;

a second control logic that receives observed quantities from said controlled object and generates a second operated quantity by performing a real-time processing of the observed quantities based on a second program;

a switch means for selectively outputting one of the first operated quantity and the second operated quantity to the controlled object based on instruction data;

a first computer that performs multi-task processing and includes the first control logic, the second control logic, and the switch means; and a second computer for modifying the first program when the switch means outputs the second operated quantity to the controlled object.

2. The control device of claim 1, wherein the instruction data is generated automatically by the control device.

3. The control device of claim 1, wherein the instruction data is generated manually by an operator.

4. A control device according to claim 1, wherein the second computer modifies the first program by inputting a source code, and the first computer compiles the source code to generate an executable code.

5. A control device according to claim 1, wherein the switch means outputs the first operated quantity to the controlled object after completing the modification of the first program.

* * * * *

UNITED STATES PATENT AND TRADEMARK OFFICE
CERTIFICATE OF CORRECTION

PATENT NO. : 6,131,050
DATED : October 10, 2000
INVENTOR(S) : Egami et al.

It is certified that error appears in the above-indentified patent and that said Letters Patent is hereby corrected as shown below:

On Title Page, Section [73], after "Ishikawajima System", insert --Technology Co., Ltd.--.

Signed and Sealed this

Twenty-ninth Day of May, 2001

Attest:

NICHOLAS P. GODICI

*Attesting Officer*   *Acting Director of the United States Patent and Trademark Office*